April 12, 1932.  F. POLLITZER  1,853,743
PROCESS FOR THE SEPARATION OF MIXTURES OF GASES
Filed Sept. 18, 1928
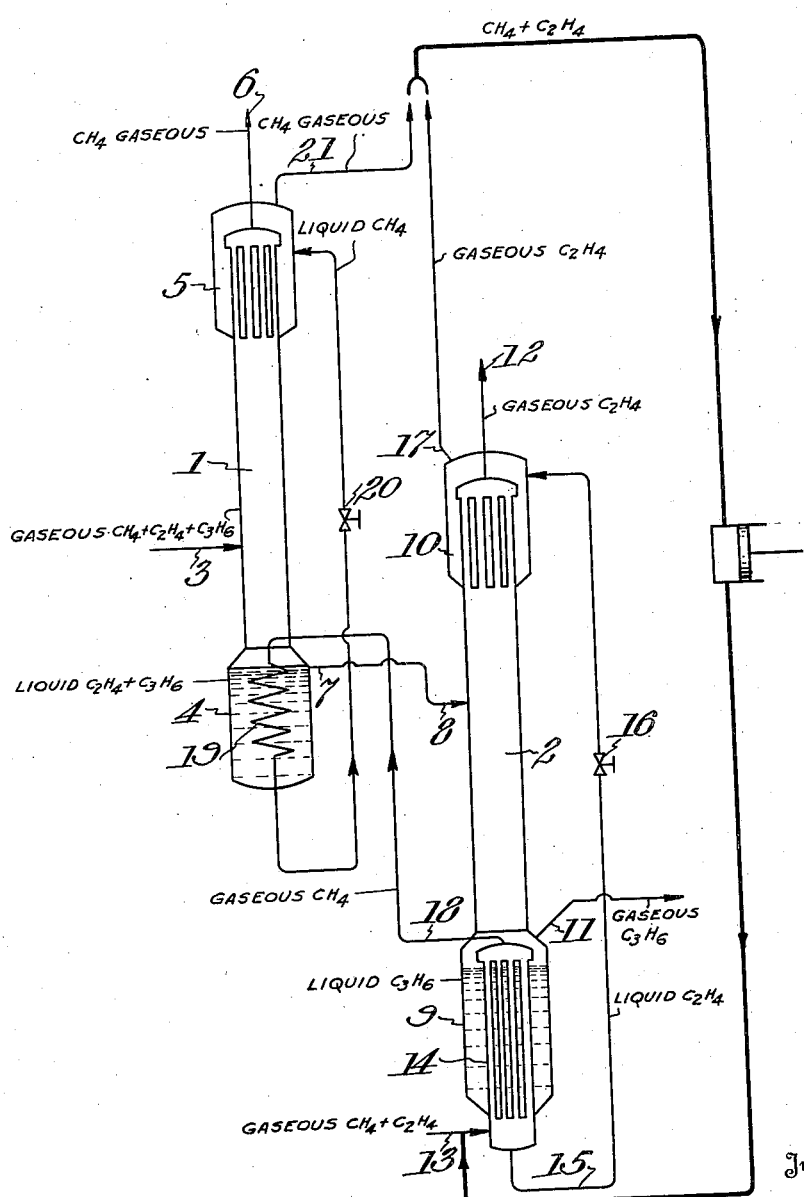
Inventor:
Franz Pollitzer
By Byrnes, Townsend & Brickenstein
his Attorneys Patented Apr. 12, 1932

1,853,743

UNITED STATES PATENT OFFICE

FRANZ POLLITZER, OF GROSSHESSELOHE, NEAR MUNICH, GERMANY

PROCESS FOR THE SEPARATION OF MIXTURES OF GASES

Application filed September 18, 1928, Serial No. 306,691, and in Germany September 30, 1927.

The present invention relates to a process for the separation of mixtures of gases into their components by the liquefaction and fractionation of the mixture, and particularly to such a process carried out with the aid of an auxiliary cycle comprising a mixture of two or more gases.

In order to obtain a complete separation of a gas mixture composed of several components by liquefaction and rectification, it is necessary at every rectification stage to supply heat at the boiling point of the higher boiling component and to remove a corresponding amount of heat at the boiling point of the lower boiling component. The heat of condensation of the components to be separated is in general not sufficient, especially if high purity and yield are required, and therefore an auxiliary substance has been used in a special cycle, which substance condenses at high temperature and pressure with evolution of heat, and revaporizes after expansion at lower pressure and correspondingly lower temperature with absorption of heat. The temperature range over which heat interchange can be carried out with such a cycle is limited at the upper end by the critical temperature of the auxiliary substance used; at the lower end the limit is fixed by the fact that the removal of the auxiliary substance at low vapor pressures offers practical difficulties because of the large volumes to be handled, and the increased difficulty of heat exchange, so that it is not advantageous to go below a temperature at which the vapor pressure of the auxiliary substance is one atmosphere. A simple auxiliary cycle is therefore no longer satisfactory when the boiling points of the components to be separated are far apart, which is especially frequently the case in the separation of a mixture consisting of three or more substances.

The present invention makes it possible to carry out the separation of such mixtures in a simple manner. Instead of one auxiliary substance, two or more are used, the vaporization ranges of which are as far apart as is required for the rectification of the mixture. In order to avoid the great complications which would be made necessary by several separate cycles with different auxiliary gases, wherein a special compressor and special counter-current heat exchanger would be required for each auxiliary gas, in the present invention a mixture of different auxiliary substances is used, the mixture being compressed in a single compressor and cooled in a single heat exchanger. In the condensation stage, however, the mixture is separated into fractions by the use of partial condensation with rectification. Because of this separation several condensates of different boiling points are obtained from the mixture, after releasing the pressure each condensate is separately vaporized at different temperatures corresponding to the different compositions, so that the condensation and vaporization practically cover the same temperature range as would be afforded by the use of separate single cycles. Only after vaporization are the components again mixed and compressed together.

The process of the present invention as applied to a mixture of three gases, for example, methane, ethylene and propylene, may be illustrated with reference to the accompanying drawing. The boiling points of the three components are 111.8°, 169.3° and 225.4° abs., respectively. Therefore, if the mixture is liquefied by compression and cooling, and it is then desired to separate the most volatile component, $CH_4$, in one rectification column, and the other two components in a second rectification column, then a transfer of heat from 112° abs. to 225° abs. is necessary, which is not feasible with a simple gas cycle.

The single figure of the accompanying drawing illustrates diagrammatically one form of system in which the process may be carried out.

In the drawing, 1 is the first rectification column in which the mixture enters at 3 after being precooled and, if necessary, liquefied in the usual manner by means of the separation products withdrawn at 6, 11 and 12 in a counter-current heat interchanger (not shown). Below the column is a vaporizing vessel 4 and above it a condenser 5. At 6 the separated low boiling component, methane, is removed. The mixture of higher boiling components runs out in the liquid state at 7 and is introduced at 8 into the second rectification column 2, which is also provided with a vaporizer 9 and a condenser 10. The least volatile component, propylene, leaves the column at 11 and the ethylene at 12.

For carrying out the rectification in accordance with the present invention, an auxiliary mixture of two materials, for instance, methane and ethylene, are brought to a proper pressure in a compressor and precooled by heat exchange with the separation products withdrawn from 6, 11 and 12. The compressor and heat exchanger are omitted from the drawing to avoid complication. The precooled compressed mixture enters at 13 into the condenser 14, which is situated in a bath of liquid propylene. The liquefier is so arranged that the liquefied components flow down in counter-current to the up-flow gas stream and in contact with the gas on extensive surfaces so that with a proper length of liquefier a substantial separation of the mixture takes place and a substantially pure ethylene collects in the lower part in the liquid state and is withdrawn at 15. After expansion through valve 16 this ethylene is introduced into condenser 10 as a cooling means. It leaves the latter at 17 in gaseous condition.

The gaseous residue of the mixture, which consists substantially of methane, is removed at 18 from the vessel 14 and liquefied in the coil 19 which is contained in a bath of liquid ethylene boiling in vessel 4. After expansion through valve 20 it serves to cool condenser 5 and is removed at 21 in the gaseous state. The components of the auxiliary mixture issuing at 17 and 21 are combined, compressed and returned to the auxiliary cycle at 13.

The pressure to which the auxiliary mixture is to be brought must be so high that both pure ethylene can be liquefied in a bath of propylene boiling at nearly one atmosphere, as well as pure methane, in the ethylene boiling at the pressure of column 1. For the first mentioned condensation a pressure of about 12 atmospheres would be sufficient, on the other hand, for the second condensation a pressure of 24 atmospheres is necessary if the methane in 4 boils at one atmosphere. If the rectification column 1 and vaporizer 4 are run at about 1 atm. pressure over atmospheric in order to favor the condensation of methane in the reflux condenser 5, the pressure for the second condensation in the coil 19 must reach at least 35 atmospheres. The circulating mixture must therefore be compressed to the latter pressure.

In a similar manner the separation of any other desired gas mixture can be carried out. If the separation is to be carried out in more than two stages, then the second condensation, instead of being carried out as described, as a total condensation, may be carried out as a partial condensation with rectification, whereby the coil 19 would be replaced by a reflux condenser similar to 14. The separation in the latter can be made more complete by providing beyond the gas entrance 13 a rectification column in which the downward flowing liquid is freed from the last amounts of the lower boiling component. For this purpose heating is to be provided (for instance, by means of the condensing auxiliary cycle mixture before it is introduced into the separation apparatus at 13), in order to produce the vapours necessary in the rectification column. The reflux condenser 14 can also be replaced by a rectification column in which the liquid obtained in a separate condensing apparatus (which can be used for heating the column) is rectified in the usual manner.

As the circulating gas there may be used any desired mixture of two or more components, the components of which condense and vaporize in the proper temperature range for the separation. It is particularly advantageous to use components which are contained in the gas to be separated, since in this case unavoidable losses of the circulating gases can easily be replaced by withdrawing from the proper places in the separating system mixtures of the desired composition. The proportion in which the components of the auxiliary gas are mixed depends upon the heat requirements of the separate rectification columns. These requirements may vary considerably according to the requirements for purity and yield of the products and according to whether it is possible to utilize the heat content of the gases to be separated for heating the various columns. Hence there is a further particular advantage which the present invention affords over the much more complicated process using separate auxiliary cycles; that is, if the requirements as to purity of the product change, then the gas mixtures in the different cycles must be altered, which is very difficult with separate cycles, but by the present process can be carried out in a very simple manner by changing the proportion of the mixture.

The described auxiliary cycle may also be advantageously utilized to produce cold and to compensate wholly or in part for the unavoidable losses of cold. If the gases used in the auxiliary cycle, as in the above described example, have a very great Joule-Thomson effect, a considerable quantity of cold may be obtained by expanding them through a throttle valve. Under certain conditions it will therefore be sufficient to compress the mixture to be separated to a moderate pressure only.

What I claim is:

1. In the separation of gas mixtures by compressing the mixture, cooling with the aid of the separated products in countercurrent flow and liquefying the gas mixture with rectification thereof in a plurality of rectifying columns serially arranged so that the high boiling products of each column of the series except the last are fed into the next succeeding column of the series, the improvement which consists in effecting the heating and cooling of the rectification columns by means of an auxiliary gas mixture consisting of at least two components, wherein said auxiliary gas mixture, after compression and countercurrent cooling, is partially liquefied by heat exchange with the bath of the liquid mixture contained in the last rectification column of the series and said liquid mixture is thereby vaporized, the liquid portion of the auxiliary gas mixture thus obtained is expanded and utilized to cool the condenser at the head of said last column, while the unliquefied portion of the auxiliary gas mixture is passed serially through the next preceding rectification columns, the portion liquefied by heat exchange with the liquid bath of each of said columns being likewise used after expansion for cooling the condenser at the top of the corresponding column, the final portion of the auxiliary gas mixture being liquefied by heat exchange with the liquid bath of the first rectification column of the series and after expansion being used for cooling the condenser at the top of said column.

2. In the separation of gas mixtures by compressing the mixture, cooling with the aid of the separated products in countercurrent flow and liquefying the gas mixture with rectification thereof in a plurality of rectifying columns serially arranged so that the high boiling products of each column of the series except the last are fed into the next succeeding column of the series, the improvement which consists in effecting the heating and cooling of the rectification columns by means of an auxiliary gas mixture consisting of at least two components, wherein said auxiliary gas mixture, after compression and countercurrent cooling, is partially liquefied by heat exchange with the bath of the liquid mixture contained in the last rectification column of the series and said liquid mixture is thereby vaporized, the liquid portion of the auxiliary gas mixture thus obtained is expanded and utilized to cool the condenser at the head of said last column, while the unliquefied portion of the auxiliary gas mixture is passed serially through the next preceding rectification columns, the portion liquefied by heat exchange with the liquid bath of each of said columns being likewise used after expansion for cooling the condenser at the top of the corresponding column, the final portion of the auxiliary gas mixture being liquefied by heat exchange with the liquid bath of the first rectification column of the series and after expansion being used for cooling the condenser at the top of said column, the vaporized and warmed up portions of the said auxiliary gas mixture being recombined, recompressed and returned to the auxiliary cycle.

3. In the separation of gas mixtures by compressing the mixture, cooling with the aid of the separated products in countercurrent flow and liquefying the gas mixture with rectification thereof in a plurality of rectifying columns serially arranged so that the high boiling products of each column of the series except the last are fed into the next succeeding column of the series, the improvement which consists in effecting the heating and cooling of the rectification columns by means of an auxiliary gas mixture consisting of at least two components, wherein said auxiliary gas mixture, after compression and countercurrent cooling, is partially liquefied by heat exchange with the bath of the liquid mixture contained in the last rectification column of the series and said liquid mixture is thereby vaporized, the liquid portion of the auxiliary gas mixture thus obtained is expanded and utilized to cool the condenser at the head of said last column, while the unliquefied portion of the auxiliary gas mixture is passed serially through the next preceding rectification columns, the portion liquefied by heat exchange with the liquid bath of each of said columns being likewise used after expansion for cooling the condenser at the top of the corresponding column, the final portion of the auxiliary gas mixture being liquefied by heat exchange with the liquid bath of the first rectification column of the series and after expansion being used for cooling the condenser at the top of said column, the auxiliary gas mixture being taken from the gas mixture to be separated at one or more points in the separation process.

4. In the separation of gas mixtures by compressing the mixture, cooling with the aid of the separated products in countercurrent flow and liquefying the gas mixture with rectification thereof in a plurality of rectifying columns serially arranged so that the high boiling products of each column of the series except the last are fed into the next succeeding column of the series, the improvement which consists in effecting the heating and cooling of the rectification columns by means of an auxiliary gas mixture consisting of at least two components, wherein said auxiliary gas mixture, after compression and countercurrent cooling, is partially liquefied by heat exchange with the bath of the liquid mixture contained in the last rectification column of the series and said liquid mixture is thereby vaporized, the liquid portion of the auxiliary gas mixture thus obtained is expanded and utilized to cool the condenser at the head of said last column, while the unliquefied portion of the auxiliary gas mixture is passed serially through the next preceding rectification columns, the portion liquefied by heat exchange with the liquid bath of each of said columns being likewise used after expansion for cooling the condenser at the top of the corresponding column, the final portion of the auxiliary gas mixture being liquefied by heat exchange with the liquid bath of the first rectification column of the series and after expansion being used for cooling the condenser at the top of said column, the auxiliary cycle being also utilized to compensate for losses of cold from the separation system.

5. In the separation of gas mixtures by compressing the mixture, cooling with the aid of separated products in countercurrent flow and liquefying the gas mixture with rectification thereof in a plurality of rectifying columns serially arranged so that the high boiling products of each column of the series except the last are fed into the next succeeding column of the series, the improvement which consists in effecting the heating and cooling of the rectification columns by means of an auxiliary gas mixture consisting of at least two components, wherein said auxiliary gas mixture, after compression and countercurrent cooling, is partially liquefied with rectification by heat exchange with the bath of the liquid mixture contained in the last rectification column of the series and said liquid mixture is thereby vaporized, the liquid portion of the auxiliary gas mixture thus obtained is expanded and utilized to cool the condenser at the head of said last column, while the unliquefied portion of the auxiliary gas mixture is passed serially through the next preceding rectification columns, the portion liquefied by heat exchange with the liquid bath of each of said columns being likewise used after expansion for cooling the condenser at the top of the corresponding column, the final portion of the auxiliary gas mixture being liquefied by heat exchange with the liquid bath of the first rectification column of the series and after expansion being used for cooling the condenser at the top of said column.

In testimony whereof, I affix my signature.

FRANZ POLLITZER.